US012771159B2

(12) United States Patent
Hu et al.

(10) Patent No.: US 12,771,159 B2
(45) Date of Patent: Oct. 20, 2026

(54) CHARGING SYSTEM AND CONTROL METHOD

(71) Applicant: Delta Electronics (Shanghai) Co., Ltd., Shanghai (CN)

(72) Inventors: Bingtao Hu, Shanghai (CN); Kehua Ma, Shanghai (CN); Daofei Xu, Shanghai (CN); Haitao Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 782 days.

(21) Appl. No.: 18/217,266

(22) Filed: Jun. 30, 2023

(65) Prior Publication Data

US 2024/0106253 A1 Mar. 28, 2024

(30) Foreign Application Priority Data

Sep. 23, 2022 (CN) ........................ 202211166120.X

(51) Int. Cl.
*H02J 7/00* (2026.01)
*H02J 7/90* (2026.01)

(52) U.S. Cl.
CPC .................................... *H02J 7/90* (2026.01)

(58) Field of Classification Search
USPC ......................................................... 320/137
See application file for complete search history.

(56) References Cited

U.S. PATENT DOCUMENTS

| | | | | |
|---|---|---|---|---|
| 2006/0145659 A1* | 7/2006 | Patino | H01M 10/4257 | 320/108 |
| 2009/0278499 A1* | 11/2009 | Niculae | H02J 4/25 | 320/132 |
| 2012/0246504 A1* | 9/2012 | Li | G06F 1/3293 | 713/300 |

FOREIGN PATENT DOCUMENTS

| | | | |
|---|---|---|---|
| CN | 1694557 | B | 5/2010 |
| CN | 105518564 | B | 12/2017 |
| CN | 113535356 | A | 10/2021 |
| CN | 115085345 | A | 9/2022 |

* cited by examiner

*Primary Examiner* — Samuel Berhanu
(74) *Attorney, Agent, or Firm* — KIRTON McCONKIE; Evan R. Witt

(57) ABSTRACT

The present disclosure provides a control method of a charging system. The control method includes: providing a charging chip, wherein the charging chip is configured to charge a chargeable device, and the charging chip performs a wake-up task with a wake-up period during a standby mode; performing a plurality of wake-up subtasks in the wake-up task; and according to the priority of each of the plurality of wake-up subtasks, setting a corresponding working cycle of each wake-up subtasks, wherein the charging chip performs each of the wake-up subtasks with the corresponding working cycle, and the wake-up subtasks with different priorities have different working cycles.

20 Claims, 4 Drawing Sheets

CHARGING SYSTEM AND CONTROL METHOD

CROSS-REFERENCE TO RELATED APPLICATION

This application claims priority to China Patent Application No. 202211166120.X, filed on Sep. 23, 2022, the entire contents of which are incorporated herein by reference for all purposes.

FIELD OF THE INVENTION

The present disclosure relates to a charging system and a control method, and particularly to a charging system and a control method for setting a working cycle of the subtask.

BACKGROUND OF THE INVENTION

With the development of fast charging power, the power consumption requirement for fast charging power is getting higher. In the specification of PD (power delivery) 3.1 standard, the output voltage and current are specified as 48V and 5 A respectively. For the fast charging chip satisfying with PD 3.1 standard, when the output voltage increases, the power consumption will increase accordingly, and thus it becomes a restriction factor of further optimizing power saving.

In many conventional fast charging powers, the power saving is also implemented under light load. However, it is difficult to meet the power saving requirement specified by PD 3.1 standard, particularly for 48V output voltage. Therefore, it is necessary to further reduce the power consumption of the fast charging power under light load.

To reduce power consumption of the fast charging power, one of the conventional solutions is to make the fast charging chip enter a standby mode. However, during the standby mode, the fast charging chip needs to be woken up with a fixed cycle, so as to perform the detection tasks for various data (e.g., communication, voltage, current, and temperature), and respond quickly when the detected data is abnormal. In the above solution, whenever the fast charging chip is woken up, all the above-mentioned data detection tasks need to be performed, resulting in extra power consumption.

SUMMARY OF THE INVENTION

It is an object of the present disclosure to provide a charging system and a control method. In this charging system and control method, the charging chip performs a plurality of wake-up subtasks according to a corresponding working cycle of each wake-up subtask during a standby mode, and the working cycles depend on the priorities of the plurality of wake-up subtasks. Thereby, by increasing the working cycle of the wake-up subtask with lower priority, the power consumption of the charging chip is reduced.

In accordance with an aspect of the present disclosure, a control method of a charging system is provided. The control method includes: providing a charging chip, wherein the charging chip is configured to charge a chargeable device, and the charging chip performs a wake-up task with a wake-up period during a standby mode; performing a plurality of wake-up subtasks in the wake-up task; and according to the priority of each of the plurality of wake-up subtasks, setting a corresponding working cycle of each wake-up subtask, wherein the charging chip performs each of the plurality of wake-up subtasks with the corresponding working cycle, and the wake-up subtasks with different priorities have different working cycles.

In accordance with another aspect of the present disclosure, a charging system is provided. The charging system includes a charging chip for charging a chargeable device, wherein the charging chip performs a wake-up task with a wake-up period during a standby mode. In the wake-up task, the charging chip performs a plurality of wake-up subtasks, and each of the plurality of wake-up subtasks has a working cycle corresponding to its priority. The charging chip performs the wake-up subtask with the corresponding working cycle, and the wake-up subtasks with different priorities have different working cycles.

The above contents of the present invention will become more readily apparent to those ordinarily skilled in the art after reviewing the following detailed description and accompanying drawings, in which:

DETAILED DESCRIPTION OF THE REFERRED EMBODIMENT

The present disclosure will now be described more specifically with reference to the following embodiments. It is to be noted that the following descriptions of embodiments of this disclosure are presented herein for purpose of illustration and description only. It is not intended to be exhaustive or to be limited to the precise form disclosed.

Figure 1:
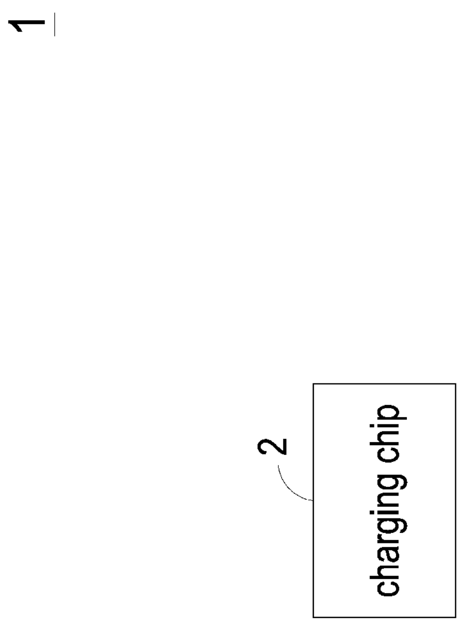
FIG. 1 is a schematic block diagram illustrating a charging system according to an embodiment of the present disclosure.

FIG. 1 is a schematic block diagram illustrating a charging system according to an embodiment of the present disclosure. As shown in FIG. 1, the charging system 1 includes a charging chip 2. The charging chip 2 is configured to charge a chargeable device (not shown), and the charging chip 2 performs a wake-up task with a wake-up period during a standby mode. In an embodiment, the charging chip 2 may be a charging chip that complies with the PD standard, such as PD 3.1. In an embodiment, the charging chip 2 may include at least two analog-digital converters (ADC). In the wake-up task, a plurality of wake-up subtasks are performed. Each wake-up subtask has a working cycle corresponding to its priority. For example, the first wake-up subtask has a first priority, and the second wake-up subtask has a second priority, and the first wake-up subtask has a first working cycle corresponding to the first priority, and the second wake-up subtask has a second working cycle corresponding to the second priority. The charging chip 2 performs each wake-up subtask with the corresponding working cycle, and the wake-up subtasks with different priorities have different working cycles. In an embodiment, the plurality of wake-up subtasks include detecting the communication, the voltage, the current, the temperature, the power and/or the interface status of the charging chip 2.

The working cycle of the wake-up subtask depends on the priority of the wake-up subtask. Among the plurality of wake-up subtasks, the wake-up subtask with higher priority corresponds to shorter working cycle, and the shorter working cycle represents that the time interval of performing this subtask is relatively shorter. On the contrary, the wake-up subtask with lower priority corresponds to longer working cycle, and the longer working cycle represents that the time interval of performing this subtask is relatively longer. That is, the higher priority wake-up subtask has a higher working frequency, and the lower priority wake-up subtask has a smaller working frequency. In some embodiments of the present disclosure, the time interval of the wake-up subtask with lower priority is increased. Therefore, within a certain period of time, the amount of times of performing the lower priority wake-up subtask is less than those of performing the higher priority wake-up subtask. Therefore, compared to the conventional charging system, which performs all the wake-up subtasks with the same working frequency, the power consumption of the charging chip 2 is reduced in the present disclosure.

In an embodiment, during the standby mode, the charging chip 2 determines whether the working cycles corresponding to the plurality of wake-up subtasks have arrived and performs the wake-up subtask whose working cycle has arrived. In addition, the working cycle corresponding to the wake-up subtask with the highest priority is the same as the wake-up period, when the charging chip 2 performs the wake-up task, the wake-up subtask with the highest priority will be performed simultaneously. The working cycle corresponding to the wake-up subtask with lower priority is an integer multiple (greater than 1) of the wake-up period. Therefore, the charging chip 2 performs the wake-up subtask with lower priority after performing the wake-up task for multiple times. In some exemplary embodiments, the wake-up period, the priority of each wake-up subtask, and/or the working cycle of each wake-up subtask may be adjustable.

The relationship between the working cycle of each wake-up subtask and the wake-up period is exemplified as follow through three wake-up subtasks X1, X2 and X3. The wake-up subtask X1 is the wake-up subtask with the highest priority. The priorities of the wake-up subtasks X2 and X3 are the same, but they are lower than the priority of the wake-up subtask X1. It should be noted that the amount and respective priority of the wake-up subtasks may be set according to actual requirements and are not limited. Please refer to FIG. 2. In the waveforms shown in FIG. 2, the high-level waveform represents that the charging chip 2 performs the corresponding wake-up task or wake-up subtask, and the low-level waveform represents that the charging chip 2 does not perform the wake-up task or wake-up subtask. In the embodiment shown in FIG. 2, the wake-up period of the wake-up task is T, and the wake-up subtask X1 has the highest priority, and the working cycle of the wake-up subtask X1 may be the same as the wake-up period T. In some embodiments, the wake-up subtask X1 with the highest priority may sample the voltage of the charging chip 2 or communicate with the charging chip 2.

Figure 2:
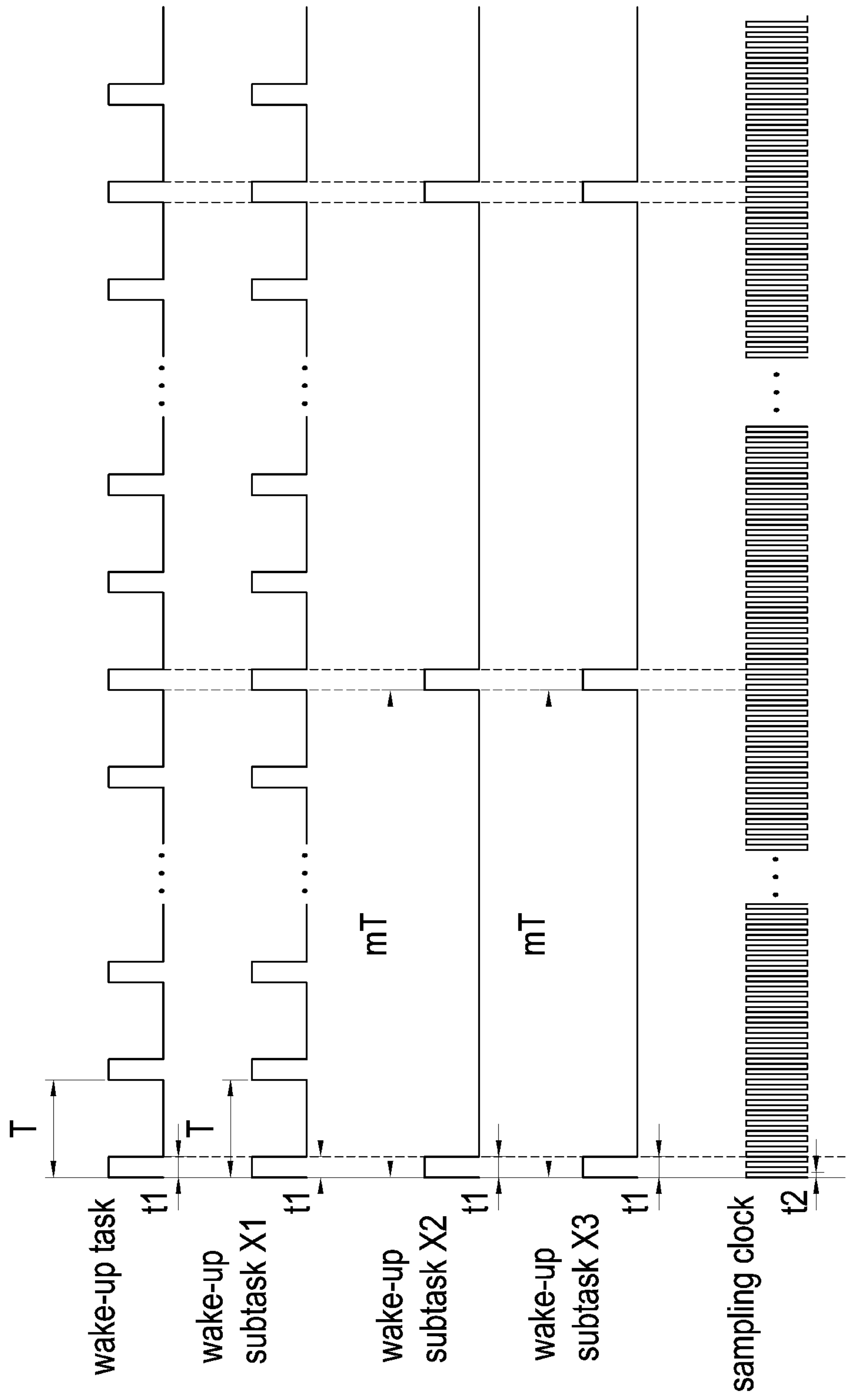
FIG. 2 schematically shows the waveforms of the wake-up task, the wake-up subtask and the sampling clock according to an embodiment of the present disclosure.

In the embodiment shown in FIG. 2, since the priorities of the wake-up subtasks X2 and X3 are the same and lower than the priority of the wake-up subtask X1, the working cycles of the wake-up subtasks X2 and X3 may be set to be m times of the wake-up period T, wherein m is an integer greater than 1. That is, the working cycle of the wake-up subtask X2 or X3 may be m*T. In some embodiments, the wake-up subtasks X2 and X3 may sample the current, the temperature, the power or the interface status of the charging chip 2.

Please refer to FIG. 2 again. In some embodiments, the charging chip 2 includes a sampling clock, and the sampling clock has a sampling frequency. The charging chip 2 performs sampling operation according to the sampling frequency of the sampling clock while performing the wake-up subtask. The duration time for performing the wake-up subtask once is t1, and the duration time for performing one sampling operation is t2. The duration time t1 is an arbitrary integer multiple of the duration time t2, so the timeslot for performing the wake-up subtask once may be able to perform at least one sampling operation. In the embodiment shown in FIG. 2, the duration time t1 for performing the wake-up task or the wake-up subtask is twice the duration time t2 for performing the sampling operation once, so the timeslot for performing wake-up subtask once may be able to perform the sampling operation twice. The sampling frequency determines the sampling times during the timeslot for performing a wake-up subtask once. Therefore, if the sampling frequency is higher, the sampling times is higher and the sampling accuracy is higher, and the power consumption required to perform the wake-up subtask is larger. On the contrary, if the sampling frequency is lower, the sampling times is lower and the sampling accuracy is lower, so the power consumption required to perform the wake-up subtask is smaller. It should be noted that the sampling frequency may be adjusted according to the power consumption requirement and is not limited.

When performing the wake-up subtask, the communication, the voltage, the current or the temperature of the charging system 1 are sampled. For example, when the sampled voltage is beyond the OVP (Over Voltage Protection) value or is below the UVP (Under Voltage Protection) value, the sampled current exceeds the OCP (Over Current Protection) value, or the sampled temperature exceeds the OTP (Over Temperature Protection) value, it represents that the charging system 1 is abnormal. Therefore, the charging chip 2 exits the standby mode and stops providing power supply to the chargeable device.

Figure 3:
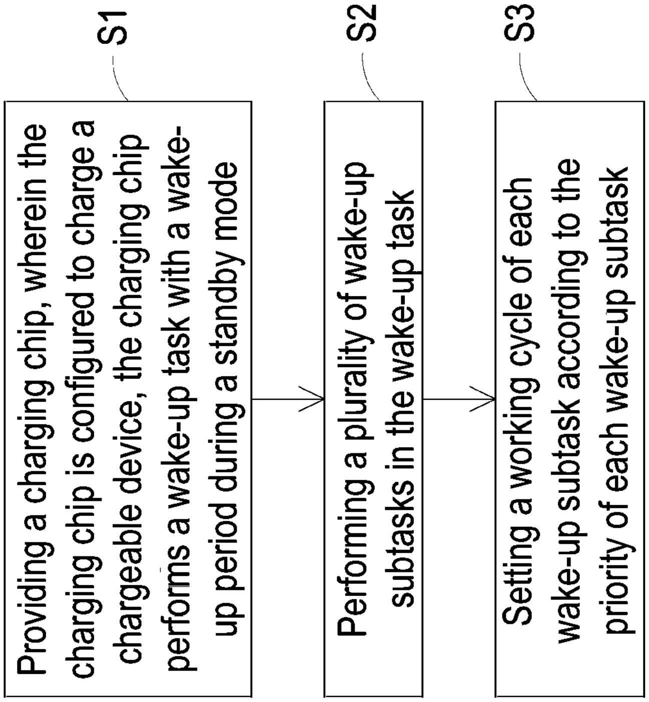
FIG. 3 is a schematic flow chart illustrating a control method of a charging system according to an embodiment of the present disclosure.

FIG. 3 is a schematic flow chart illustrating a control method of a charging system according to an embodiment of the present disclosure. The control method of the charging system of the present disclosure is applicable for the charging system 1. As shown in FIG. 3, the control method includes steps S1, S2 and S3. In the step S1, a charging chip 2 is provided to charge a chargeable device. When the charging chip 2 is in standby mode, the charging chip 2 performs a wake-up task with a wake-up period. In the step S2, a plurality of wake-up subtasks are performed in the wake-up task. In the step S3, a working cycle of the wake-up subtask is set according to respective priority of each of the plurality of wake-up subtasks. The charging chip 2 performs each wake-up subtask with the corresponding working cycle, and the wake-up subtasks with different priorities have different working cycles. In an embodiment, the wake-up subtask includes detecting the communication, the voltage, the current, the temperature, the power or the interface status of the charging chip 2. The working cycle of the wake-up subtask depends on a priority of the wake-up subtask. Among the plurality of wake-up subtasks, the wake-up subtask with higher priority corresponds to the shorter working cycle.

In an embodiment, the control method of the charging system further includes: determining whether the working cycles corresponding to the plurality of wake-up subtasks have arrived and performing the wake-up subtask whose working cycle has arrived in the wake-up task by the charging chip 2. In an embodiment, the working cycle corresponding to the wake-up subtask with the highest priority is the same as the wake-up cycle.

Figure 4:
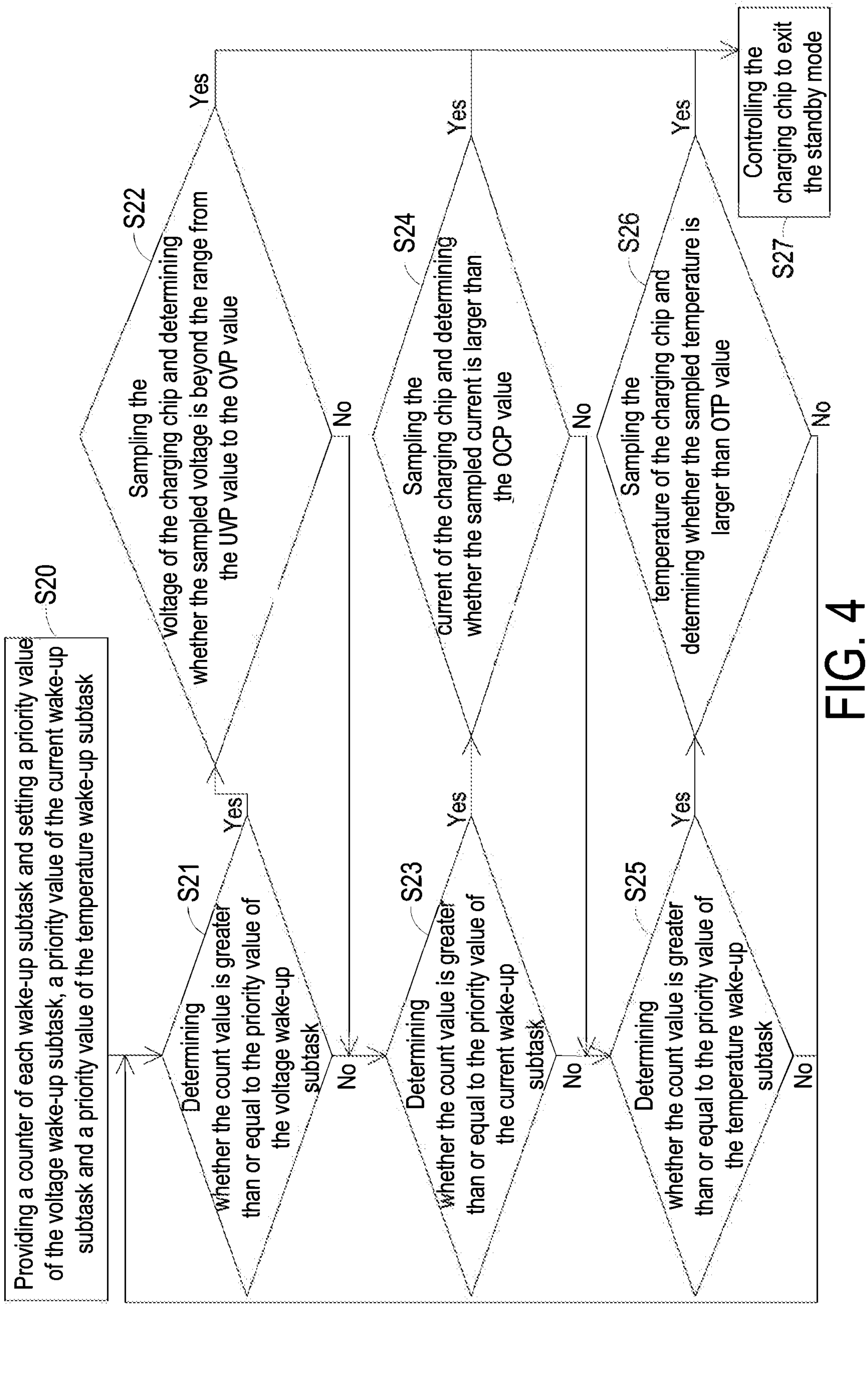
FIG. 4 schematically shows the substeps of the step S2 of FIG. 3.

In an embodiment, in the step S2, the way of setting the working cycle of the wake-up subtask is to set a priority value according to the priority of each wake-up subtask. Then, the priority value is compared with a count value of the counter, thereby determining whether the work cycle has arrived and performing the wake-up subtask correspondingly. In FIG. 4, the wake-up subtasks include the voltage wake-up subtask, the current wake-up subtask and the temperature wake-up subtask, which include sampling the voltage, the current and the temperature of the charging chip 2 respectively. As shown in FIG. 4, the step S2 includes the following steps.

In the step S20, a counter of each wake-up subtask is provided, and a priority value Cv of the voltage wake-up subtask, a priority value Ci of the current wake-up subtask and a priority value Ct of the temperature wake-up subtask are set. The counter of each wake-up subtask has a count value, and the initial count value is zero. The magnitude of the priority value of the wake-up subtask depends on the priority of the wake-up subtask. The higher the priority of the wake-up subtask is, the smaller the priority value of the wake-up subtask is. If the priority of the wake-up subtask is the highest, the priority value is set to be zero. For example, if the priorities of the voltage wake-up subtask, the current wake-up subtask and the temperature wake-up subtask are in a descending order, the priority value Cv of the voltage wake-up subtask, the priority value Ci of the current wake-up subtask priority value and the priority value Ct of the temperature wake-up subtask satisfies as $Cv<Ci<Ct$.

In the step S21, determining whether the count value of the counter of the voltage wake-up subtask is greater than or equal to the priority value Cv of the voltage wake-up subtask. If the determination is 'Yes', the counter of the voltage wake-up subtask is reset to zero, and jumping into the step S22. If the determination is 'No', the count value of the counter of the voltage wake-up subtask is incremented by one, and jumping into the step S23. In the step S22, the voltage of the charging chip 2 is sampled to compare with the OVP value and the UVP value. If the sampled voltage is beyond the range from the UVP value to the OVP value, jumping into the step S27, while the step S23 is performed if the sampled voltage falls within the range from the UVP value to the OVP value.

In the step S23, determining whether the count value of the counter of the current wake-up subtask is greater than or equal to the priority value Ci of the current wake-up subtask. If the determination is 'Yes', the counter of the current wake-up subtask is reset to zero, and jumping into the step S24. If the determination is 'No', the count value of the counter of the current wake-up subtask is incremented by one, and jumping into the step S25. In the step S24, the current of the charging chip 2 is sampled to compare with the OCP value. If the sampled current is larger than the OCP value, jumping into the step S27, while the step S25 is performed if the sampled current does not exceed the OCP value.

In the step S25, determining whether the count value of the counter of the temperature wake-up subtask is greater than or equal to the priority value Ct of the temperature wake-up subtask. If the determination is 'Yes', the counter of the temperature wake-up subtask is reset to zero, and jumping into the step S26. If the determination is 'No', the count value of the counter of the temperature wake-up subtask is incremented by one, and jumping into the step S21. In the step S26, the temperature of the charging chip 2 is sampled to compare with the OTP value. If the sampled temperature is larger than the OTP value, jumping into the step S27, while the step S21 is performed if the sampled temperature does not exceed the OTP value.

In the step S27, the charging chip 2 is controlled to exit the standby mode.

In the embodiment shown in FIG. 4, the priority value of the voltage wake-up subtask and the corresponding count value are compared firstly. Then, the priority value of the current wake-up subtask and its corresponding count value are compared. And finally, the priority value of the temperature wake-up subtask and its corresponding count value are compared. In another embodiment, the current wake-up subtask or the temperature wake-up subtask and corresponding count values can be compared firstly, and the comparison sequence can be adjusted according to actual needs and is not limited.

From the above descriptions, the present disclosure provides a charging system and a control method. In this charging system and control method, the charging chip performs a wake-up subtask according to a corresponding working cycle during a standby mode, and the setting of the working cycle depends on the priority of the wake-up subtask. Thereby, the working cycle of the wake-up subtask with lower priority is increased so that the power consumption of the charging chip is reduced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method of a charging system, comprising:

providing a charging chip, wherein the charging chip is configured to charge a chargeable device, and the charging chip performs a wake-up task with a wake-up period during a standby mode;

performing a plurality of wake-up subtasks in the wake-up task; and according to the priority of each of the plurality of wake-up subtasks, setting a corresponding working cycle of each wake-up subtask, wherein the charging chip performs each of the plurality of wake-up subtasks with the corresponding working cycle, and the wake-up subtasks with different priorities have different working cycles.

2. The control method according to claim 1, wherein among the plurality of wake-up subtasks, the wake-up subtask with higher priority corresponds to shorter working cycle.

3. The control method according to claim 2, further comprising:

in the wake-up task, determining whether the working cycles of the plurality of wake-up subtasks have arrived and performing the wake-up subtask whose working cycle has arrived by the charging chip.

4. The control method according to claim 1, wherein the working cycle corresponding to the wake-up subtask is m times of the wake-up period, wherein m is a positive integer.

5. The control method according to claim 4, wherein the working cycle corresponding to the wake-up subtask with the highest priority is the same as the wake-up period.

6. The control method according to claim 1, wherein the wake-up period is adjustable.

7. The control method according to claim 1, wherein the priority corresponding to each of the plurality of wake-up subtasks is adjustable.

8. The control method according to claim 1, wherein the working cycle corresponding to each of the plurality of wake-up subtasks is adjustable.

9. A charging system, comprising:

a charging chip for charging a chargeable device, wherein the charging chip performs a wake-up task with a wake-up period during a standby mode, wherein in the wake-up task, the charging chip performs a plurality of wake-up subtasks, and each of the plurality of wake-up subtasks has a working cycle corresponding to its priority;

wherein the charging chip performs the wake-up subtask with the corresponding working cycle, and the wake-up subtasks with different priorities have different working cycles.

10. The charging system according to claim 9, wherein among the plurality of wake-up subtasks, the wake-up subtask with higher priority corresponds to shorter working cycle.

11. The charging system according to claim 10, wherein in the standby mode, the charging chip determines whether the working cycles corresponding to the plurality of wake-up subtasks have arrived and performs the wake-up subtask whose working cycle has arrived.

12. The charging system according to claim 9, wherein the working cycle corresponding to the wake-up subtask is m times of the wake-up period, wherein m is a positive integer.

13. The charging system according to claim 12, wherein the working cycle corresponding to the wake-up subtask with the highest priority is the same as the wake-up period.

14. The charging system according to claim 9, wherein the wake-up period is adjustable.

15. The charging system according to claim 9, wherein the priority corresponding to each of the plurality of wake-up subtasks is adjustable.

16. The charging system according to claim 9, wherein the working cycle corresponding to each of the plurality of wake-up subtasks is adjustable.

17. The charging system according to claim 9, wherein the plurality of wake-up subtasks comprise a voltage wake-up subtask, a current wake-up subtask, and a temperature wake-up subtask.

18. The charging system according to claim 9, wherein one of the plurality of wake-up subtasks performs the sampling operation for the voltage, the current, the temperature, the power or the interface status of the charging chip.

19. The charging system according to claim 18, wherein the charging chip comprises at least two analog-digital converters (ADC).

20. The charging system according to claim 9, wherein the charging chip is applied to PD3.1 standard.

* * * * *